SAMUEL S. BARRIE.
Improvement in Epergnes for Fruits and Flowers.
No. 125,003.                   Patented March 26, 1872.
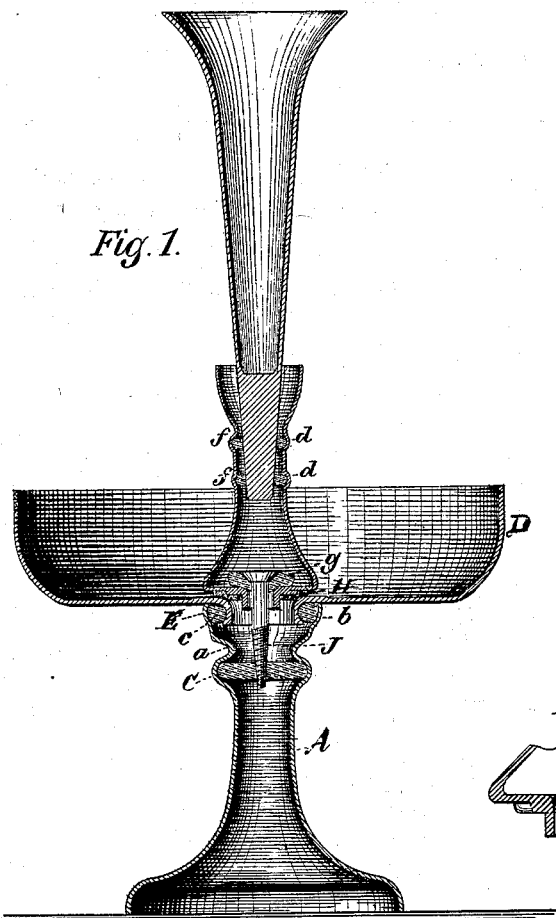
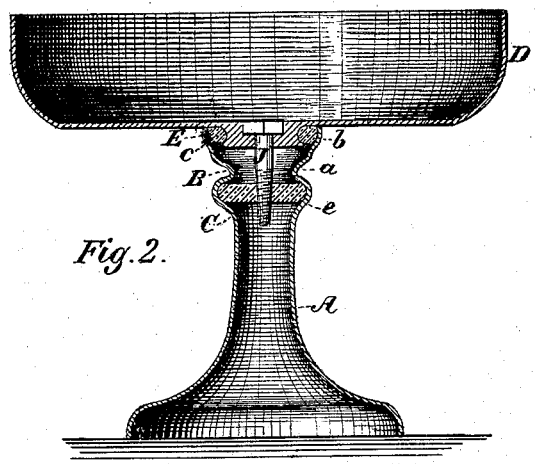
Witnesses:
Inventor:
Samuel S. Barrie.
By James L. Norris.
Atty.

UNITED STATES PATENT OFFICE.

SAMUEL S. BARRIE, OF NEW YORK, N. Y.

IMPROVEMENT IN EPERGNES FOR FRUITS AND FLOWERS.

Specification forming part of Letters Patent No. 125,003, dated March 26, 1872.

Specification describing certain Improvements in Epergnes for Fruits and Flowers, invented by SAMUEL S. BARRIE, of the city, county, and State of New York.

The object of this invention is to provide means whereby the several parts forming the epergne may be firmly connected, made capable of resisting sudden shocks and jars, and relatively adjusted so as to hide any deviations of the edges of the bowls, &c., from a horizontal plane, due to warping in the process of annealing; and the invention consists, first, in the construction of the pedestal with a contracted neck or superior portion to receive and retain a suitable packing or filling of plaster Paris, &c., together with an elastic washer or nut; second, in providing the bowl with a downwardly-projecting boss, around which a ring of rubber or other elastic material is sprung; third, in the construction of the boquet-holder, whereby it may be used with the pedestal alone and independent of the bowl; and fourth, in the interposition of the elastic washers or packings between the portions of the epergne, so as to prevent injury arising from jars or sudden shocks. The various parts of the epergne are made of metal, pressed or blown glass, or of any suitable material.

In the drawing, Figure 1 is a sectional elevation of my improved epergne. Fig. 2 is a sectional elevation, showing the mode of connection when the boquet-holder is omitted; Fig. 3, a perspective view of the lower corrugated end of the boquet-holder; Fig. 4, a vertical section of the lower end of boquet-holder.

The hollow pedestal A is broad at the base, and tapers upward to within a short distance from the top, where it first expands to form a bead, $e$, is then contracted to form a neck, $a$, and expands to form a cup-shaped bearing, $b$, for the reception of the boss or projection on the base of the bowl. Within the cavity formed by the bead $e$ is fixed a piece of rubber or other elastic material, C, having a small opening in it for the reception of the screw J. Above the elastic material is a filling, B, of plaster Paris, or its equivalent, extending up to and filling the intermediate space between the rubber and the projecting boss of the bowl. This filling is penetrated by the screw J, which it serves to steady as well as protect from contact with the glass. The rubber C forms a nut for the end of the screw. The bowl D is provided with a downwardly-projecting boss, $c$; said boss being of grooved perimeter so as to receive and retain an elastic ring or packing, E, which is sprung into its place around the boss. A central opening is formed in the bottom of the bowl for the passage of the bolt or screw T. The boss and packing are of such diameter as to fit accurately into the cup or concave bearing $b$ of the pedestal. This construction allows of the relative adjustment of the bowl and pedestal, so that if, in annealing the bowl, its edges have become warped out of plane, it can be adjusted to cover the defect. The socket F of the boquet-holder is formed with a broad base, and tapers to about the center, where are two beads, $d\ d$. It then expands to a bell-shape for the reception of holder. The base of the socket F is also provided with a downwardly-projecting rim or boss, G, between which and the central opening of the bowl a rubber or elastic washer, H, is interposed, affording a soft and yielding bed for the socket, and preventing breakage. Inside of the beads or recesses $d$ rubber rings $f\ f$ are placed, the function of which is to "bite" against and retain the holder in position. The bowl, socket, and pedestal are secured together by bolt J, the head of said bolt being provided with a conical rubber ring, $g$, which rests within the opening of the rim or boss G of the socket. The bolt passes through the central opening in the bottom of the bowl, thence through the plaster filling in the upper part of the pedestal, and is tightened by means of the nut or washer C. The bowl may be omitted and the socket F secured directly in the cup or concave bearing $b$ of the pedestal, in which case the boss of the socket may be formed with a concave perimeter and be surrounded with a packing of the form shown at E; or a plain elastic washer, H, may be used, as desired. Such portions of the bowl, socket, &c., as come in contact with the washers or elastic packings may be roughened, if desired, in order to render the surfaces adherent; or the packings may be corrugated. When the various parts are united the washers act as springs, preventing injury from sudden shocks.

Having thus described my invention, what I claim, and desire to secure by Letters Patent, is—

1. The pedestal provided with the neck $a$ and filling B, in combination with the bolt J and elastic nut or washer C, as and for the purpose set forth.

2. The bowl D having boss $c$, in combination with elastic packing E and the pedestal A, as and for the purpose specified.

3. The socket F having rim or boss G, in combination with the elastic packing and the pedestal A, as set forth.

4. The elastic packings E and H interposed between the parts of an "epergne," as set forth, and for the purpose specified.

5. A screw or bolt, J, provided with an elastic cushion, $g$, and arranged within a bouquet-holder socket so as to engage with an elastic nut, C, within a pedestal, for the purpose of connecting the two together, with or without the interposition of the bowl D, substantially as described, and for the purpose set forth.

To the above I have signed my name this 3d day of February, A. D. 1872.

SAMUEL S. BARRIE.

Witnesses:
C. H. LOVE,
R. W. McCONNELL.